(12) United States Patent
Jia et al.

(10) Patent No.: US 11,011,034 B2
(45) Date of Patent: May 18, 2021

(54) EGRESS CONTROLLER, EGRESS CONTROL SYSTEM AND MOBILE COMMUNICATION TERMINAL

(71) Applicant: Carrier Corporation, Palm Beach Gardens, FL (US)

(72) Inventors: Zhen Jia, Shanghai (CN); Danqing Sha, Shanghai (CN); Zhengang Zhu, Shanghai (CN); Guichun Zhou, Shanghai (CN); Timothy C. Wagner, East Hartford, CT (US); Michael J. Birnkrant, Wethersfield, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/750,272

(22) Filed: Jan. 23, 2020

(65) Prior Publication Data
US 2020/0242901 A1    Jul. 30, 2020

(30) Foreign Application Priority Data

Jan. 25, 2019   (CN) .......................... 201910073109.0

(51) Int. Cl.
*G08B 7/00* (2006.01)
*G08B 7/06* (2006.01)
(Continued)

(52) U.S. Cl.
CPC ........... *G08B 7/066* (2013.01); *G01C 21/206* (2013.01); *H04L 9/0631* (2013.01);
(Continued)

(58) Field of Classification Search
CPC ......... H04W 4/024; H04W 4/33; H04W 4/90; H04W 4/50; H04W 4/80; H04W 12/0608; H04W 12/001; G08B 7/066; G01C 21/206
See application file for complete search history.

(56) References Cited

U.S. PATENT DOCUMENTS 9,465,816 B2 * 10/2016 Johnson .............. G06F 16/5866
2003/0069002 A1 * 4/2003 Hunter ................... G09F 27/00
455/404.2
(Continued)

FOREIGN PATENT DOCUMENTS

WO     2018217469 A1    11/2018

OTHER PUBLICATIONS

European Search Report for Application No. 20153213.2; dated Jun. 16, 2020; 9 Pages.

*Primary Examiner* — Ojiako K Nwugo
(74) *Attorney, Agent, or Firm* — Cantor Colburn LLP

(57) ABSTRACT

An evacuation controller, an evacuation control system, and a mobile communication terminal. The evacuation controller includes: a local control unit capable of storing or acquiring evacuation path information to or from a cloud via a mobile communication terminal, wherein the evacuation path information is configured at least based on a layout of a building and a location of a danger occurred in the building. According to the evacuation controller and the evacuation control system, exchange of evacuation path information between the local control unit and a remote provider service system is realized through exchange between the mobile communication terminal and the cloud; or by configuring evacuation path information directly in the local control unit, the local control unit can clearly and timely learn about the local (Continued)

evacuation path information and can evacuate people based on the local evacuation path information.

18 Claims, 1 Drawing Sheet

(51) Int. Cl.
  *H04W 4/024*   (2018.01)
  *H04W 4/33*   (2018.01)
  *H04W 4/90*   (2018.01)
  *H04W 76/50*   (2018.01)
  *H04W 4/80*   (2018.01)
  *G01C 21/20*   (2006.01)
  *H04L 9/06*   (2006.01)
  *H04L 9/32*   (2006.01)
  *H04L 29/06*   (2006.01)
  *H04W 12/03*   (2021.01)
  *H04W 12/06*   (2021.01)

(52) U.S. Cl.
  CPC ........ *H04L 9/3228* (2013.01); *H04L 63/0838* (2013.01); *H04W 4/024* (2018.02); *H04W 4/33* (2018.02); *H04W 4/80* (2018.02); *H04W 4/90* (2018.02); *H04W 12/03* (2021.01); *H04W 12/068* (2021.01); *H04W 76/50* (2018.02)

(56) References Cited

U.S. PATENT DOCUMENTS

| | | | | |
|---|---|---|---|---|
| 2007/0298758 A1* | 12/2007 | Verma | .................. | G08B 27/006 |
| | | | | 455/404.1 |
| 2009/0247116 A1* | 10/2009 | Sennett | .................. | H04M 11/04 |
| | | | | 455/404.2 |
| 2011/0136463 A1* | 6/2011 | Ebdon | .................... | G08B 7/066 |
| | | | | 455/404.1 |
| 2013/0024106 A1* | 1/2013 | Kumar | .................. | G01C 21/20 |
| | | | | 701/423 |
| 2013/0060729 A1* | 3/2013 | Massey | .................. | G06Q 10/00 |
| | | | | 707/600 |
| 2013/0339304 A1* | 12/2013 | Lee | ..................... | G06F 11/1461 |
| | | | | 707/652 |
| 2015/0279184 A1 | 10/2015 | Kore et al. | | |
| 2015/0330796 A1 | 11/2015 | S R et al. | | |
| 2016/0027139 A1* | 1/2016 | Sigrist, Jr. | ............ | G06Q 50/265 |
| | | | | 705/325 |
| 2016/0205514 A1* | 7/2016 | Ikeda | .................... | H04W 4/043 |
| | | | | 455/456.1 |
| 2016/0371966 A1* | 12/2016 | P | ......................... | G01C 21/3415 |
| 2017/0024839 A1* | 1/2017 | Klein | .................. | H04W 76/50 |
| 2018/0328737 A1* | 11/2018 | Frey | .................... | G01C 21/3667 |
| 2019/0130718 A1* | 5/2019 | Alpert | .................. | G08B 26/008 |
| 2019/0197855 A1* | 6/2019 | Lingala | .................. | G08B 7/066 |
| 2019/0217131 A1* | 7/2019 | Zechlin | ............. | G06K 9/00771 |
| 2019/0320210 A1* | 10/2019 | Ilhan | ............... | H04N 21/234309 |
| 2019/0387386 A1* | 12/2019 | Sethi | ..................... | H04B 7/0413 |

\* cited by examiner

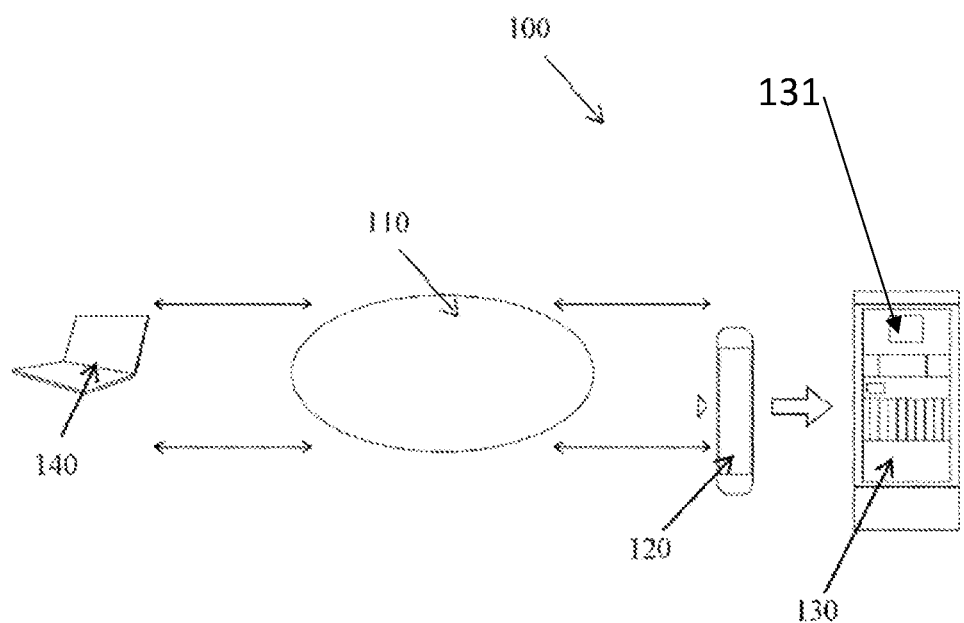

EGRESS CONTROLLER, EGRESS CONTROL SYSTEM AND MOBILE COMMUNICATION TERMINAL

FOREIGN PRIORITY

This application claims priority to Chinese Patent Application No. 201910073109.0, filed Jan. 25, 2019, and all the benefits accruing therefrom under 35 U.S.C. § 119, the contents of which in its entirety are herein incorporated by reference.

TECHNICAL FIELD

The present application relates to the field of building security, and in particular to an evacuation controller and an evacuation control system.

BACKGROUND ART

A building evacuation system is an important part of ensuring the building security. Therefore, in actual application, after plan and design of building construction, its emergency evacuation passages and exits have been completed, an evacuation path most reasonable for the current situation should also be planned after considering impact of sudden emergencies such as fire and earthquake on the building. At present, evacuation path information and solution in the event of an emergency are usually compiled by a corresponding provider in a workshop, and then the computer is brought to the target building and connected to a local control module via a data line to input the evacuation path information. This process is extremely time-consuming and labor-consuming when the workshop is very distant from the target building or the target building is of a large size. Moreover, damage caused by the emergency will increase rapidly as its duration increases. In addition, location change and range expansion of the emergency will lead to changes in the evacuation path. Therefore, dynamic output of the evacuation path information is also extremely important.

SUMMARY OF THE INVENTION

In view of this, the present application provides an evacuation controller, an evacuation control system, and a mobile communication terminal, thereby effectively solving or at least alleviating one or more of the above problems and other aspects of the prior art.

To achieve the objective of the present application, in accordance with the first aspect of the present application, there is provided an evacuation controller, including: a local control unit capable of storing or acquiring evacuation path information to or from a cloud via a mobile communication terminal, wherein the evacuation path information is configured at least based on a layout of a building and a location of a danger occurred in the building.

Optionally, the local control unit includes a wireless communication module and stores or acquires evacuation path information to or from the mobile communication terminal through the wireless communication module.

Optionally, the wireless communication module includes a Bluetooth module and/or a WIFI module, and the communication of the wireless communication module is encrypted via the AES-CCM algorithm.

Optionally, the danger occurred in the building is fire.

Optionally, the wireless communication module and the mobile communication terminal establish a connection after being verified via the TOTP token algorithm.

Optionally, the evacuation path information exchanged between the cloud, the mobile communication terminal and the local control unit is encrypted via the TLS-128 algorithm.

According to another aspect of the present application, there is also provided an evacuation controller, including: a local control unit and a readable storage medium; wherein the readable storage medium is operated under the control of the local control unit to configure evacuation path information at least based on a layout of a building and a location of a danger occurred in the building.

According to yet another aspect of the present application, there is also provided an evacuation control system, including the evacuation controller described above.

According to still another aspect of the present application, there is also provided an evacuation control system, including: a cloud configured to upload and download configured evacuation path information; a mobile communication terminal configured to upload or download the evacuation path information to or from the cloud; and a local control unit configured to store or acquire the evacuation path information to or from the mobile communication terminal; wherein the evacuation path information is configured at least based on a layout of a building and a location of a danger occurred in the building.

Optionally, the evacuation control system further includes a plurality of voice interaction devices disposed in a target building, each of the voice interaction devices being controlled by the local control unit to broadcast the evacuation path information in real time at a set location.

Optionally, the voice interaction device is further configured to receive voice information of a user and feed the same back to the local control unit; and feed response information back under the control of the local control unit.

Optionally, the local control unit includes a wireless communication module and stores or acquires evacuation path information to or from the mobile communication terminal through the wireless communication module.

Optionally, the wireless communication module includes a Bluetooth module and/or a WIFI module, and the communication of the wireless communication module is encrypted via the AES-CCM algorithm.

Optionally, the danger occurred in the building is fire.

Optionally, the wireless communication module and the mobile communication terminal establish a connection after being verified via the TOTP token algorithm.

Optionally, the evacuation path information uploaded to the cloud is encrypted via the AES-128 algorithm and added with a micro ECC digital signature.

Optionally, the cloud authenticates the mobile communication terminal with a telephone number.

Optionally, the cloud has an abnormality detecting module configured to define the mobile communication terminal as an abnormality when the telephone number corresponding to the mobile communication terminal changes Optionally, the evacuation path information exchanged between the cloud, the mobile communication terminal and the local control unit is encrypted via the TLS-128 algorithm.

According to further aspect of the present application, there is also provided a mobile communication terminal for an evacuation control system, wherein the mobile communication terminal is capable of communicating with a cloud and a local control unit of the evacuation control system respectively, such that the mobile communication terminal is capable of uploading or downloading evacuation path information to or from the cloud, and the local control unit is capable of storing or acquiring evacuation path information to or from the mobile communication terminal; wherein the evacuation path information is configured at least based on a layout of a building and a location of a danger occurred in the building.

According to the evacuation controller and the evacuation control system of the present application, exchange of evacuation path information between the local control unit and a remote provider service system is realized through exchange between the mobile communication terminal and the cloud; or by configuring evacuation path information directly in the local control unit, the local control unit can clearly and timely learn about the local evacuation path information and can evacuate people based on the evacuation path information, realizing efficient configuration and application of the evacuation path information.

BRIEF DESCRIPTION OF THE DRAWINGS

The technical solutions of the present application will be further described in detail below with reference to accompanying drawings and embodiments. However, it should be understood that these drawings are only for the purpose of explanation and are not intended to limit the scope of the present application. In addition, unless specifically pointed out, the drawings are only intended to illustrate the structural constructions described herein in concept, and are not necessarily drawn to scale.

FIG. 1 is a schematic diagram of an evacuation control system of the present application.

DETAILED DESCRIPTION

The present application will now be described more fully hereinafter with reference to the accompanying drawings in which exemplary embodiments of the present application are illustrated. However, the present invention may be embodied in many different forms and should not be construed as being limited to the embodiments set forth herein. Rather, these embodiments are provided to make the present disclosure thorough and complete, and to fully convey the concept of the present application to those skilled in the art.

Although the features of the present application are disclosed in connection with several embodiments or one of the embodiments, such features may be combined with one or more other features of other implementations/embodiments if it may be desirable and/or advantageous for any given or identifiable function.

Several functional entities may be mentioned herein, which do not necessarily correspond to physically or logically independent entities. These functional entities may be implemented in software, or implemented in one or more hardware modules or integrated circuits, or implemented in different processing devices and/or microcontroller devices.

First, an embodiment of an evacuation control system is provided herein. The evacuation controller herein includes a local control unit that can be presented in a form of a computer, a control box, or the like. Here, the local control unit is capable of storing or acquiring evacuation path information to or from a cloud via a mobile communication terminal. In such arrangement, exchange of evacuation path information between the local control unit and a remote provider service system can be realized in the field of building evacuation through exchange between the mobile communication terminal and the cloud, so that the local control unit can clearly and timely learn about the local evacuation path information and can evacuate people based on the evacuation path information, realizing efficient configuration and application of the evacuation path information.

Here the evacuation path information should be configured at least based on a layout of a building and a location of a danger occurred in the building, so that the evacuation path matches the passage and the exit in the building, and at the same time, avoids the fire or other dangerous locations as much as possible. Of course, if other sensing devices are also provided in the building, the evacuation path information can also be configured in combination with the sensing devices. For example, the evacuation path can be configured to be closer to a crowded place so that the crowd can escape from the site as much as possible. As another example, multiple branches can be provided on the evacuation path so that people near different emergency evacuation exits can select their more accessible destinations as needed. A location of a danger occurred in the building is a factor to be considered for the configuration of the evacuation path information, which may dynamically change in a short time as the condition of the danger changes and the danger location diverts. Therefore, in an emergency of natural disaster such as a fire, a earthquake and the like, or an emergency of man power disaster such as a shooting incident, a violence incident and the like, the evacuation path information is configured and transmitted in real time to ensure reliable and timely evacuation and rescue.

In addition, regarding the transmission process of the evacuation path information, the local control unit may specifically include a wireless communication module, and may store or acquire evacuation path information to or from the mobile communication terminal through the wireless communication module. More specifically, the wireless communication module may include a Bluetooth module or a WIFI module to perform a wireless communication function. Such arrangement provides a convenient and feasible way to transmit data, and ensures stable high-capacity data transmission at high speed.

Considering the particularity, sensitivity and importance of the evacuation path information, it is extremely important to ensure the security and reliability of its data. Thus, the present concept provides several security means for protecting data from the communication level, as will be exemplified below.

For example, on the one hand, the communication process of the wireless communication module is encrypted via the AES-CCM algorithm; on the other hand, the wireless communication module and the mobile communication terminal may also establish a connection after being verified via the TOTP token algorithm. Furthermore, the evacuation path information exchanged between the cloud, the mobile communication terminal and the local control unit can be encrypted via the TLS-128 algorithm, thereby ensuring the security of the entire communication process.

In addition, the mobile communication terminal and the cloud mentioned in this embodiment are both objects that can be interacted with the local control unit after being authorized. The authorization may be achieved through a password login, or through receiving a verification code by the communication terminal, or through other authorization manner. Only after the authorization can the mobile communication terminal or the cloud be considered as the mobile communication terminal and the cloud in the present concept. This will be exemplified below with reference to an evacuation control system incorporating this part of feature.

Referring to FIG. 1, an embodiment of an evacuation control system 100 is also provided herein. The evacuation control system 100 includes: a cloud 110 configured to upload and download configured evacuation path information; a mobile communication terminal 120 configured to download evacuation path information from the cloud 110; and a local control unit 130 capable of storing or acquiring evacuation path information to and from the mobile communication terminal 120. Such arrangement provides a complete evacuation control system 100 capable of data management and exchange, which can realize exchange of the evacuation path information between the local control unit 130 and the remote provider service system 140 in the field of building evacuation through exchange between the mobile communication terminal 120 and the cloud 110, so that the local control unit 130 can clearly and timely learn about the local evacuation path information and can evacuate people based on the evacuation path information, realizing efficient configuration and application of the evacuation path information.

Here, the evacuation path information should be configured at least based on the layout of the building and the location of the danger occurred in the building, so that the evacuation path matches the passage and the exit in the building, and at the same time, avoids the fire or other dangerous locations as much as possible. Of course, if other sensing devices are also provided in the building, the evacuation path information can also be configured in combination with the sensing devices. For example, the evacuation path can be configured to be closer to a crowded place so that the crowd can escape from the site as much as possible. As another example, multiple branches can be provided on the evacuation path so that people near different emergency evacuation exits can select their more accessible destinations as needed. A location of a danger occurred in the building is a factor to be considered for the configuration of the evacuation path information, which may dynamically change in a short time as the condition of the danger changes and the danger location diverts. Therefore, in an emergency of natural disaster such as a fire, a earthquake and the like, or an emergency of man power disaster such as a shooting incident, a violence incident and the like, the evacuation path information is configured and transmitted in real time to ensure reliable and timely evacuation and rescue.

In addition, to further ensure that the evacuation path information configured in real time can be timely communicated to the people in the building in an emergency situation, the system may further include a plurality of voice interaction devices (e.g., speakers 150) disposed within the target building, and each of the voice interaction devices is controlled by the local control unit 130 to broadcast the evacuation path information in real time at the set location. For example, when the fire only occurs in area A in the building, the evacuation path information will be configured based on this information, and the configured evacuation path information will be broadcast by the speakers 150 in real time throughout the building to give a guide to evacuate people in the building. Further, when the fire spreads to area B in the building, the evacuation path information shall be reconfigured, and the reconfigured evacuation path information will be broadcast by the speakers 150 in real time throughout the building to give a newest dynamic guide to evacuate people in the building. Compared to conventional static signs (evacuation strobe lights) or static speakers (playing pre-recorded voice), in such arrangement, people throughout the building can get updated dynamic evacuation path information through the voice interaction device close to them, thereby realizing efficient and reliable evacuation and rescue.

Optionally, on the basis of the foregoing, the voice interaction device can be further configured to receive voice information of a user and feed the same back to the local control unit 130; and feed response information back under the control of the local control unit 130, thereby further expanding the function of such hardware as the voice interaction device. For example, in a fire, earthquake, terrorist attack, or other emergency situations, a voice interaction device such as a speaker can be used to interact with a person to provide the necessary assist or support information as needed, such as evacuation path information, evacuation floor location, fire equipment deployment points, dangerous places/rooms, etc. In the normal application state of the building, the voice interaction device can also be used to interact with people to provide information such as weather, building map, destination index, customer service call, etc. as needed, thereby expanding the application scope. The entity responding through the local control unit 130 to the inquiry transmitted from the voice interaction device can be a computer, an outsourced service team or an operator of the building.

Similarly, regarding the transmission process of the evacuation path information, the local control unit 130 may specifically include a wireless communication module 131, and may store or acquire evacuation path information to or from the mobile communication terminal 120 through the wireless communication module 131. More specifically, the wireless communication module 131 may include a Bluetooth module or a WIFI module to perform a wireless communication function. Such arrangement provides a convenient and feasible way to transmit data, and ensures stable high-capacity data transmission at high speed.

In addition, considering the particularity, sensitivity and importance of the evacuation path information, it is extremely important to ensure the security and reliability of its data. Thus, the present concept provides several security means for protecting data from the communication level, as will be exemplified below.

For example, it includes communication between the wireless communication module of the local control unit 130 and the mobile communication terminal 120, communication between the mobile communication terminal 120 and the cloud 110, and communication between the cloud 110 and the evacuation path information service provider workshop. The security and data integrity for any of the communication processes should be guaranteed to ensure the validity of the data eventually written to the local control unit 130. Based on this premise, regarding the communication between the wireless communication module and the mobile communication terminal 120, on the one hand, the communication process of the wireless communication module is encrypted via the AES-CCM algorithm; on the other hand, the wireless communication module and the mobile communication terminal 120 may also establish a connection after being verified via the TOTP token algorithm, so as to ensure the security of the communication process. Further, regarding the communication between the mobile communication terminal 120 and the cloud 110, the cloud 110 may be arranged to authenticate the mobile communication terminal 120 with a telephone number, for example, in the form of receiving a short message or a voice verification code. On the basis of this, the cloud 110 may also be provided with an abnormality detecting module, and the abnormality detecting module is configured to define the mobile communication terminal 120 as an abnormality when the telephone number corresponding to the mobile communication terminal 120 changes, thereby further strictly controlling the authentication process. Furthermore, regarding the communication between the cloud 110 and remote terminal of the evacuation path information service provider, it may be arranged that the evacuation path information uploaded to the cloud 110 is encrypted via the AES-128 algorithm and added with a micro ECC digital signature. In addition, optionally, the evacuation path information exchanged between the cloud 110, the mobile communication terminal 120, and the local control unit 130 may also be encrypted via the TLS-128 algorithm.

Although not shown in the drawings, there is also provided an embodiment of a mobile communication terminal used in the evacuation control system of any of the foregoing embodiments or combinations thereof. Specifically, a corresponding app may be set in the mobile communication terminal to perform login, authentication, and data exchange. In addition, login, authentication, and data exchange can be performed in the form of a website to form a secure and reliable data link between the cloud and the local control unit.

At the same time, there may be another type of scenario, that is, the network connection during emergency situations in some buildings fails, and the evacuation path information cannot be downloaded from the cloud and transmitted to the local control unit. Accordingly, another embodiment of an evacuation controller is also provided in the present concept. The evacuation controller includes: a local control unit and a readable storage medium; wherein the readable storage medium may be operated under the control of the local control unit to configure evacuation path information at least based on the layout of the building and the location of the danger occurred in the building. At this time, the evacuation path information can be configured directly in the local control unit, so that it can clearly and timely learn about the local evacuation path information and can evacuate people based on the evacuation path information, realizing efficient configuration and application of the evacuation path information.

Of course, both of the foregoing two technical means can also be configured at the same time in the evacuation controller. On the one hand, when the network is unblocked, the configured evacuation path information can be acquired through exchange with the remote terminal. Such evacuation path information can be efficiently configured through a program, and is checked by a highly experienced technician in the field to ensure the reliability of the evacuation path information. On the other hand, when the network fails, the program can also be directly run locally to configure the evacuation path information to improve the stability of the services provided by the entire evacuation system.

Similarly, an embodiment of an evacuation control system is also provided herein that may include the evacuation controller of the foregoing embodiments or any combination thereof, and thus have the same technical effects.

Moreover, as will be understood by one of ordinary skill in the art, some aspects of the present application can be embodied as a system, method, or computer program product. Accordingly, some aspects of the present application may take the form of an entirely hardware implementation, an entirely software implementation (including firmware, resident software, microcode, etc.), or software and hardware combined implementation, generally referred to herein as "service", "circuit", "circuit systems", "module", and/or "processing system" collectively. Furthermore, aspects of the present application can take the form of a computer program product embodied in one or more computer readable media having computer readable program codes embodied thereon.

Any combination of one or more computer readable media with computer programs stored thereon can be utilized, and the program can be executed by a processor to implement the methods and steps in any or a combination of the foregoing embodiments. The computer readable medium can be a computer readable signal medium or a computer readable storage medium. The computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of computer readable storage media will include the following: an electrical connection with one or more wires, a portable computer disk, a hard disk, a random access memory (RAM), a read only memory (ROM), an erasable programmable read only memory (EPROM or flash memory), optical fiber, a portable compact disc read only memory (CD-ROM), an optical storage device, a magnetic storage device, or any suitable combination of the foregoing. In the context of this document, a computer readable storage medium may can contain, or store any tangible medium for use by or in connection with an instruction execution system, apparatus, or device.

Program codes and/or executable instructions embodied on a computer readable medium can be transmitted using any suitable medium, including but not limited to wireless manner, a wire line, an optical fiber cable, RF, etc., or any suitable combination of the above.

Computer program codes for carrying out operations of aspects of the present application can be written in any combination of one or more programming languages, including object-oriented programming languages such as Java, C #, C++, etc., and conventional programming languages, such as, "C" programming language or similar programming language. The program codes may execute entirely on the user's computer (device), partly on the user's computer, as a stand-alone software package, partly on the user's computer and partly on a remote computer, or entirely on the remote computer or server. In the latter case, the remote computer can be connected to the user's computer via any type of network, including a local area network (LAN) or a wide area network (WAN), or can be connected to an external computer (e.g., using an internet service provider via the internet).

The computer program instructions can be provided to a processor of a general purpose computer, a processor of a special purpose computer, such as an image processor or other programmable data processing device to produce a machine such that instructions are executed by a processor or other programmable data processing device of the computer to create a manner implementing the functions/actions specified in one or more of the blocks of the flowcharts and/or block diagrams.

The computer program instructions can also be loaded onto a computer, other programmable data processing apparatus, or other device to cause a series of operational steps to be performed on the computer, other programmable apparatus or other device to produce a computer-implemented process such that the instructions executed on the computer or other programmable apparatus provide a procedure for implementing the functions and actions specified herein.

Specific embodiments herein may show, disclose, and claim in a particular order of steps, but it is understood that the steps may be carried out in any order, separated or combined, unless otherwise indicated, and will still benefit from the disclosure.

The description uses examples to disclose the present application, including the best modes, and to enable any person skilled in the art to practice the present application, including making and using any device or system and performing any of the methods covered. The patent scope of the present application is defined by the claims, and may include other examples that are apparent to those skilled in the art. If such other examples have structural elements that are not different from the literal language of the claims, or if they include equivalent structural elements that are not substantially different from the literal language of the claims, they are meant to be within the scope of the claims.

What is claimed is:

1. An evacuation control system comprising:
   a local control unit configured for storing or acquiring evacuation path information to or from a cloud via a mobile communication terminal, wherein the evacuation path information is configured at least based on a layout of a building and a location of a danger occurred in the building.

2. The evacuation control system according to claim 1, wherein the local control unit comprises a wireless communication module and stores or acquires evacuation path information to or from the mobile communication terminal through the wireless communication module.

3. The evacuation control system according to claim 2, wherein communication of the wireless communication module is encrypted.

4. The evacuation control system according to claim 2, wherein the danger occurred in the building is fire.

5. The evacuation control system according to claim 2, wherein the wireless communication module and the mobile communication terminal establish a connection after being verified via a token algorithm.

6. The evacuation control system according to claim 2, wherein the evacuation path information exchanged between the cloud, the mobile communication terminal and the local control unit is encrypted.

7. An evacuation control system comprising:
   a cloud configured to upload and download configured evacuation path information;
   a mobile communication terminal configured to upload or download the evacuation path information to or from the cloud; and
   a local control unit configured to store or acquire the evacuation path information to or from the mobile communication terminal;
   wherein the evacuation path information is configured at least based on a layout of a building and a location of a danger occurred in the building.

8. The evacuation control system according to claim 7, further comprising a plurality of voice interaction devices disposed in a target building, each of the voice interaction devices being controlled by the local control unit to broadcast the evacuation path information in real time at a set location.

9. The evacuation control system according to claim 8, wherein the voice interaction device is further configured to receive voice information of a user and feed the same back to the local control unit; and feed response information back under the control of the local control unit.

10. The evacuation control system according to claim 8, wherein the evacuation path information uploaded to the cloud is encrypted.

11. The evacuation control system according to claim 8, wherein the cloud authenticates the mobile communication terminal with a telephone number.

12. The evacuation control system according to claim 11, wherein the cloud has an abnormality detecting module configured to define the mobile communication terminal as an abnormality when the telephone number corresponding to the mobile communication terminal changes.

13. The evacuation control system according to claim 8, wherein the evacuation path information exchanged between the cloud, the mobile communication terminal and the local control unit is encrypted via.

14. The evacuation control system according to claim 7, wherein the local control unit comprises a wireless communication module and stores or acquires evacuation path information to or from the mobile communication terminal through the wireless communication module.

15. The evacuation control system according to claim 14, wherein communication of the wireless communication module is encrypted.

16. The evacuation control system according to claim 14, wherein the danger occurred in the building is fire.

17. The evacuation control system according to claim 14, wherein the wireless communication module and the mobile communication terminal establish a connection after being verified via a token algorithm.

18. A mobile communication terminal for an evacuation control system, wherein the mobile communication terminal is configured for communicating with a cloud and a local control unit of the evacuation control system, respectively, such that the mobile communication terminal is configured for uploading or downloading evacuation path information to or from the cloud, and the local control unit is configured for storing or acquiring evacuation path information to or from the mobile communication terminal;
   wherein the evacuation path information is configured at least based on a layout of a building and a location of a danger occurred in the building.

* * * * *